(12) United States Patent
Chen et al.

(10) Patent No.: US 10,155,620 B2
(45) Date of Patent: Dec. 18, 2018

(54) FASTENING TIP FOR CARGO SUPPORT BEAM

(71) Applicant: Ningbo Xuli Metal Products Co., Ltd., Ningbo (CN)

(72) Inventors: Weiguo Chen, Ningbo (CN); Yanqiong Chen, Ningbo (CN); Wei Deng, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 0 days.

(21) Appl. No.: 15/604,278

(22) Filed: May 24, 2017

(65) Prior Publication Data

US 2018/0186564 A1 Jul. 5, 2018

(30) Foreign Application Priority Data

Dec. 29, 2016 (CN) .......................... 2016 1 1240763

(51) Int. Cl.
*B65D 90/00* (2006.01)
*B60P 7/15* (2006.01)

(52) U.S. Cl.
CPC ....... *B65D 90/004* (2013.01); *B65D 90/0053* (2013.01); *B60P 7/15* (2013.01)

(58) Field of Classification Search
CPC ............ B65D 2590/005; B65D 90/004; B65D 90/0053; B65D 90/0073
USPC ....... 410/152, 143, 144, 151, 102, 129, 153, 410/156, 34, 49; 403/325, 327, 22, 252, 403/254, 263, 361, 52; 296/39.2, 39.1, 296/181.3, 183.1, 40, 331, 403, 405
See application file for complete search history.

(56) References Cited

U.S. PATENT DOCUMENTS

| | | | | |
|---|---|---|---|---|
| 3,095,830 A * | 7/1963 | Gerd Runken | ...... | B61D 45/002 16/87 R |
| 4,074,634 A * | 2/1978 | Snow | ........................ | B60P 7/08 410/152 |
| 5,807,047 A * | 9/1998 | Cox | .......................... | B60P 7/15 410/143 |
| 6,074,143 A * | 6/2000 | Langston | .................. | B60P 1/00 410/143 |
| 7,134,820 B2 * | 11/2006 | Ehrlich | ..................... | B60P 7/15 410/150 |
| 2013/0266393 A1 * | 10/2013 | Calico | ....................... | B60P 1/00 410/152 |

* cited by examiner

*Primary Examiner* — D Glenn Dayoan
*Assistant Examiner* — Sunsurraye Westbrook
(74) *Attorney, Agent, or Firm* — Wang Law Firm, Inc.

(57) ABSTRACT

A fastening tip for connecting a cargo support beam to a track, which comprises a first side plate, a second side plate, a stopping plate, a torsional spring and a lining plate, wherein the top surface of the top portion of the stopping plate is flat, and the stopping plate has an operating fin exposed outside; he lining plate engages the stopping plate when the top portion of the stopping plate tightly resists against the edge of the positioning hole. In the present invention, the damage due to the extrusion of cargos or by an external force is effectively prevented from; in addition, the manual operation space is increased, and the operation is more convenient.

7 Claims, 5 Drawing Sheets

FASTENING TIP FOR CARGO SUPPORT BEAM

FIELD OF THE INVENTION

The present invention relates to the technical field of layered installation structures in containers, and particularly to a fastening tip for connecting a cargo support beam to a track.

DESCRIPTION OF THE PRIOR ART

During the logistics transportation, a large amount of cargos are placed into containers. Generally, an inner space of a carriage is not layered. Sometimes, there is only one tray in the inner space and an upper half of the inner space is empty. As a result, the utilization of the inner space of the carriage is low. Sometimes, two trays are placed into a carriage, that is, an upper tray is directly placed on a lower tray. In this way, the lower tray is likely to be damaged.

To solve the above problem, a Chinese Patent CN102941992B (application No.: CN201210517407.2), entitled LAYERING DEVICE USED IN CARRIAGE, has disclosed a device, which comprises strip-shaped tracks fixedly connected to an inner side of a container, wherein each of the tracks has a number of positioning holes in the length direction of the track; a support beam is provided between two adjacent parallel tracks; fasteners are provided at both ends of the support beam; each of the fasteners is provided with a fastening structure capable of being fastened to a positioning hole or disengaged from the positioning hole, and the fastening structure includes a positioning bayonet and a demising portion which are both indented into two sides of the fastener. After the fasteners are inserted into the positioning holes, the positioning bayonets are clamped at lower edges of the positioning holes, and gaps for allowing the fasteners to disengage from the positioning holes are provided between the demising portions and the upper edges of the positioning holes. A barrier strip is further hinged to the fastener, and a spring is provided between the barrier strip and the fastener. Due to the elasticity of the spring, an outer end of the barrier strip tends to extend out from the demising portion. With the structure, it is convenient to divide the carriage into layers. However, in order to conveniently operate this structure by a finger, a manipulation portion of the barrier strip is located on the top and higher than the upper surfaces of the fasteners. Thus, after the structure is assembled, the manipulation portion on the top of the barrier strip is easy to be bent or damaged by the cargos in the upper layer, and the support beam cannot be disassembled smoothly. Meanwhile, since the manipulation portion is provided on the top of the barrier strip, the manipulation portion is too close to the tracks after the structure is assembled. As a result, the manipulation space is small, and it is inconvenient for manipulation.

Hence, it is necessary to make further improvements to the existing structures for positioning and mounting cargo support beams.

SUMMARY OF THE INVENTION

A technical problem to be solved by the present invention is to provide a fastening tip for connecting a cargo support beam to a track, which may effectively avoid the damage caused by an external force and is convenient to operate.

To solve the technical problem mentioned above, the fastening tip for connecting a cargo support beam to a track with a plurality of positioning holes, comprises:

a first side plate having a body, a top edge, a bottom edge, an insertion portion extending away from the top edge, a first limiting opening defined on the body and adjacent to the bottom edge; a second side plate having a body, a top edge, a bottom edge, an insertion portion extending away from the top edge, a first limiting opening defined on the body and adjacent to the bottom edge; the first side plate and the second side plate being disposed parallel to each other; a mounting clearance being formed between the first side plate and the second side plate, the mounting clearance having a front side; a stopping plate with a top portion, a bent middle portion and a rear portion, rotatably disposed in the front side of the mounting clearance; an operating fin connected to the stopping plate; a lining plate disposed within the mounting clearance; and a torsional spring with two ends disposed under the stopping plate; wherein the torsional spring enables the top portion of the stopping plate to rest against the edge of the positioning hole; the top surface of the top portion of the stopping plate is flat, and the stopping plate has an operating fin exposed outside; the lining plate engages the stopping plate when the top portion of the stopping plate tightly resists against the edge of the positioning hole.

Preferably, in the solution, the stopping plate is L-shaped; the bent middle portion of the stopping plate is rotatably connected to at least one of the first side plate and the second side plate; an accommodating opening, for receiving rotatably the rear portion of the stopping plate, is formed in front of the lining plate; the torsional spring is disposed within the accommodating opening; and one end of the torsional spring rests against the lower surface of the stopping plate, while other end of the torsional spring rests against a bottom edge of the accommodating opening. With such a structure, the stopping plate and the lining plate are coordinated to realize the rotation of the stopping plate and thus realize the locking and disassembly of the stopping plate and a positioning hole on the inner wall of a container, so that it is convenient to use.

Preferably, the operating fin is obliquely arranged at the rear end of the stopping plate, and the support plate is shaped as a slope corresponding to the operating fin; a manipulation hole for allowing the operating fin to pass therethrough is formed on each of the first side plate and the second side plate, and the manipulation holes are aligned with the accommodating opening. With such a structure, the operating fin can be supported simultaneously by the manipulation hole on the side plate and the slope of the accommodating opening on the lining plate, so that the upper surface of the stopping plate can resist against the inner edge of the positioning hole so as to lock the fastening tip. With such a structure, it is also convenient to allow the stopping plate to be disengaged from the positioning hole by overcoming the acting force from the torsional spring, when the operating fin is stirred by a hand.

Preferably, to enable the stopping plate to coordinate with the lining plate, a declining portion for allowing the upper portion of the stopping plate to rotate backward is formed on the lining plate.

In the preferred solutions, a second limiting opening aligning with the first limiting openings on the insertion portion is formed on the lining plate.

Preferably, the top edge and the bottom edge of the first side plate extended away from the body to form a first upper support arm and a first lower support arm. the top edge and the bottom edge of the second side plate extended away from the body to form a second upper support arm and a second lower support arm; and the top surface of the top portion of the stopping plate is lower than an upper surface of the first upper support arm and an upper surface of the second upper support arm, or aligned with the upper surface of the first upper support arm and the upper surface of the second upper support arm.

Preferably, for connection convenience, a cargo support beam tube is transversely and movably sheathed around the first side plate and the second side plate; guide holes, which are formed transversely, are defined on the body of the first side plate and the second side plate; a connecting hole for allowing a guide pin to pass therethrough is formed on the cargo support beam tube.

Compared with the prior art, the present invention has the following advantages: the present invention is simple and rational in structure; by configuring the top surface of the top portion as a plane, providing a manipulation portion for rotating the stopping plate on a side of the stopping plate and meanwhile providing a lining plate coordinated with the stopping plate between the first side plate and the second side plate, in the assembled state, the top surface of the top portion is located within a positioning hole on an inner wall of a container and resists against the inner edge of the top of the positioning hole, and two operating fins respectively pass through the first side plate and/or the second side plate, so that the stopping plate does not exposed outside the first side plate and the second side plate, accordingly the damage due to the extrusion of cargos or by an external force is effectively prevented from; in addition, by providing the operating fins of the stopping plate on an outer side of the first side plate and/or the second side plate, the manual operation space is increased, and the operation is more convenient.

DETAILED DESCRIPTION OF THE PREFERRED EMBODIMENT

Figure 1:
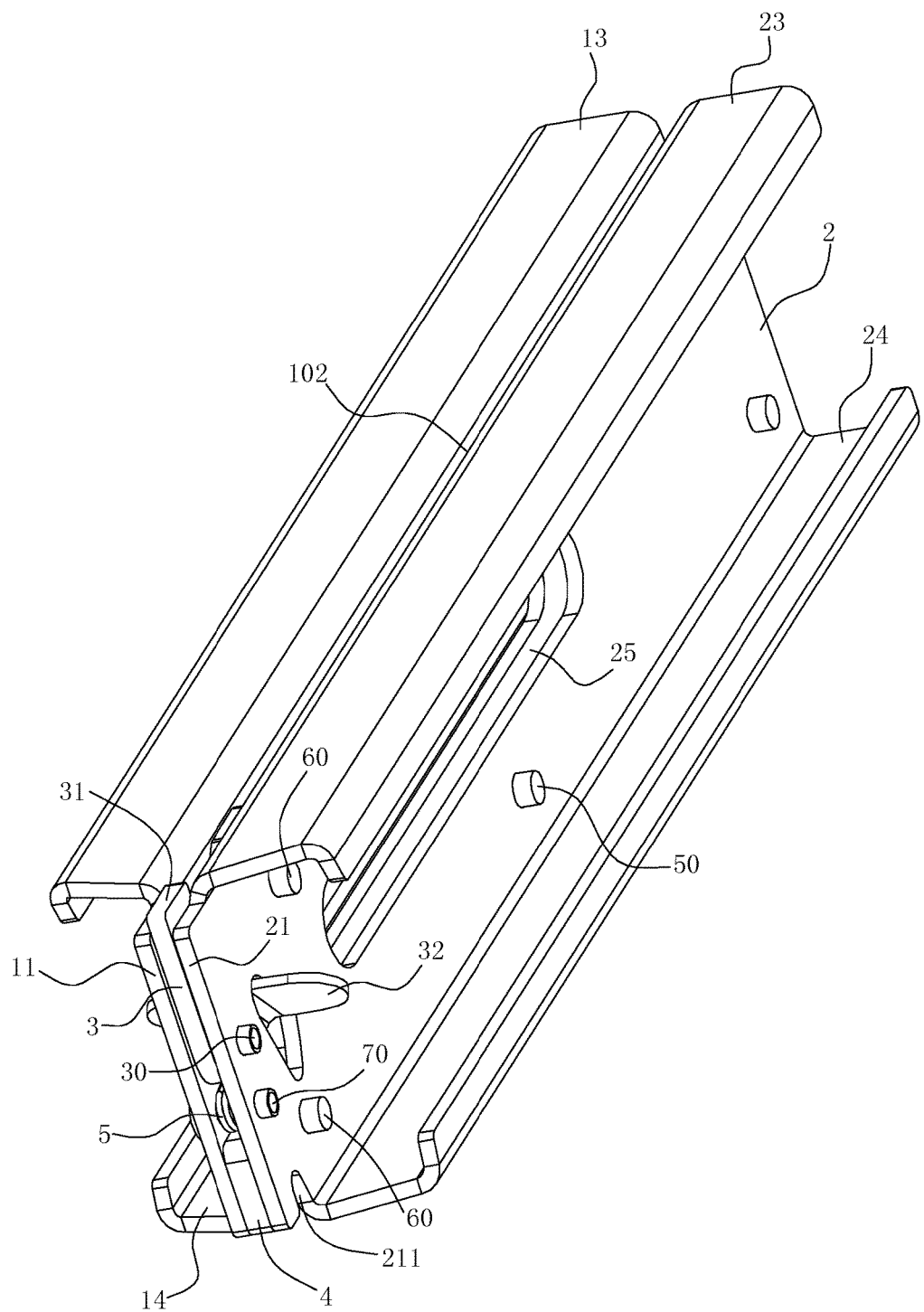
FIG. 1 is a perspective view of a fastening tip for connecting a cargo support beam to a track according to an embodiment of the present invention.
Figure 2:
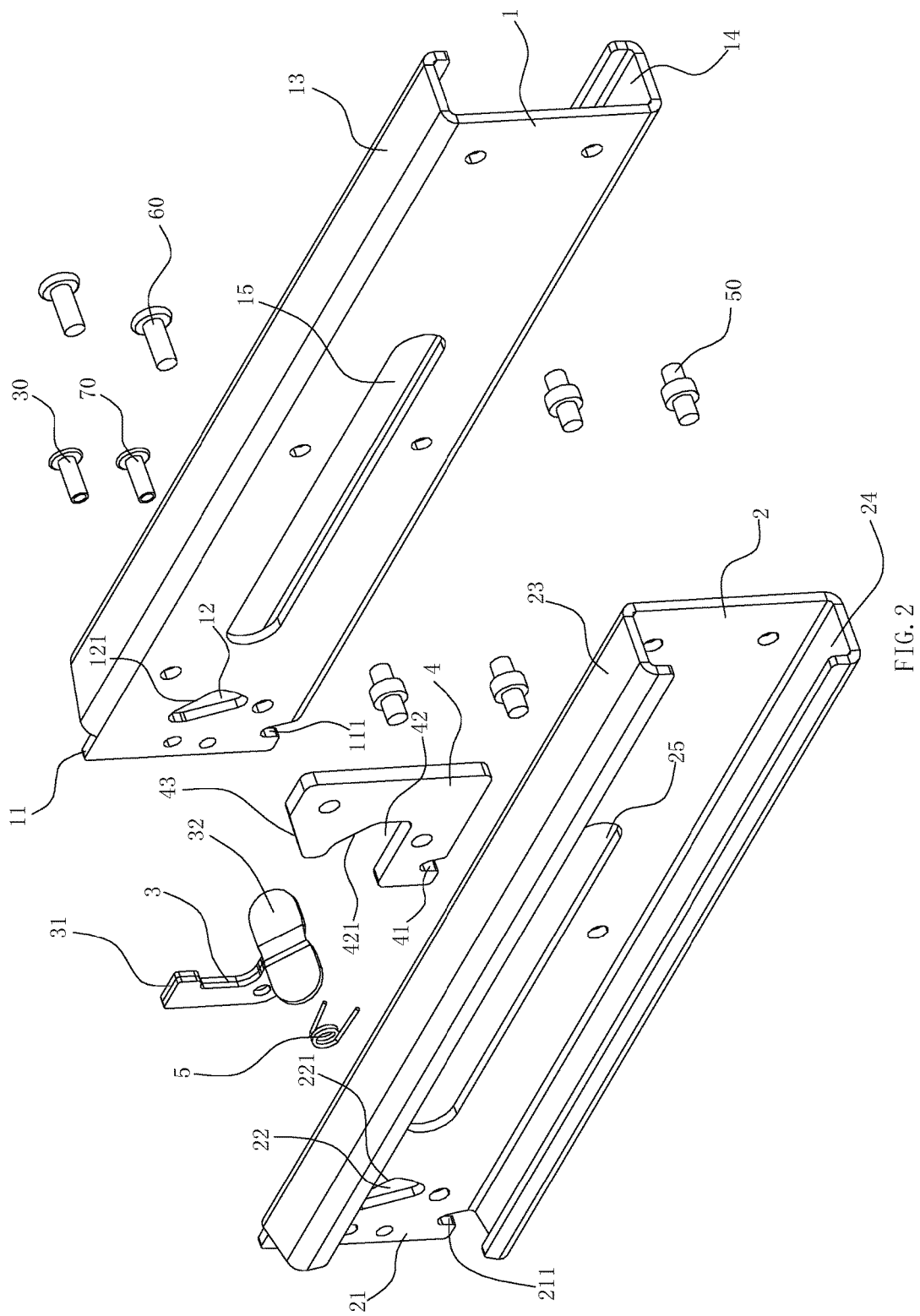
FIG. 2 is an exploded view of FIG. 1.
Figure 3:
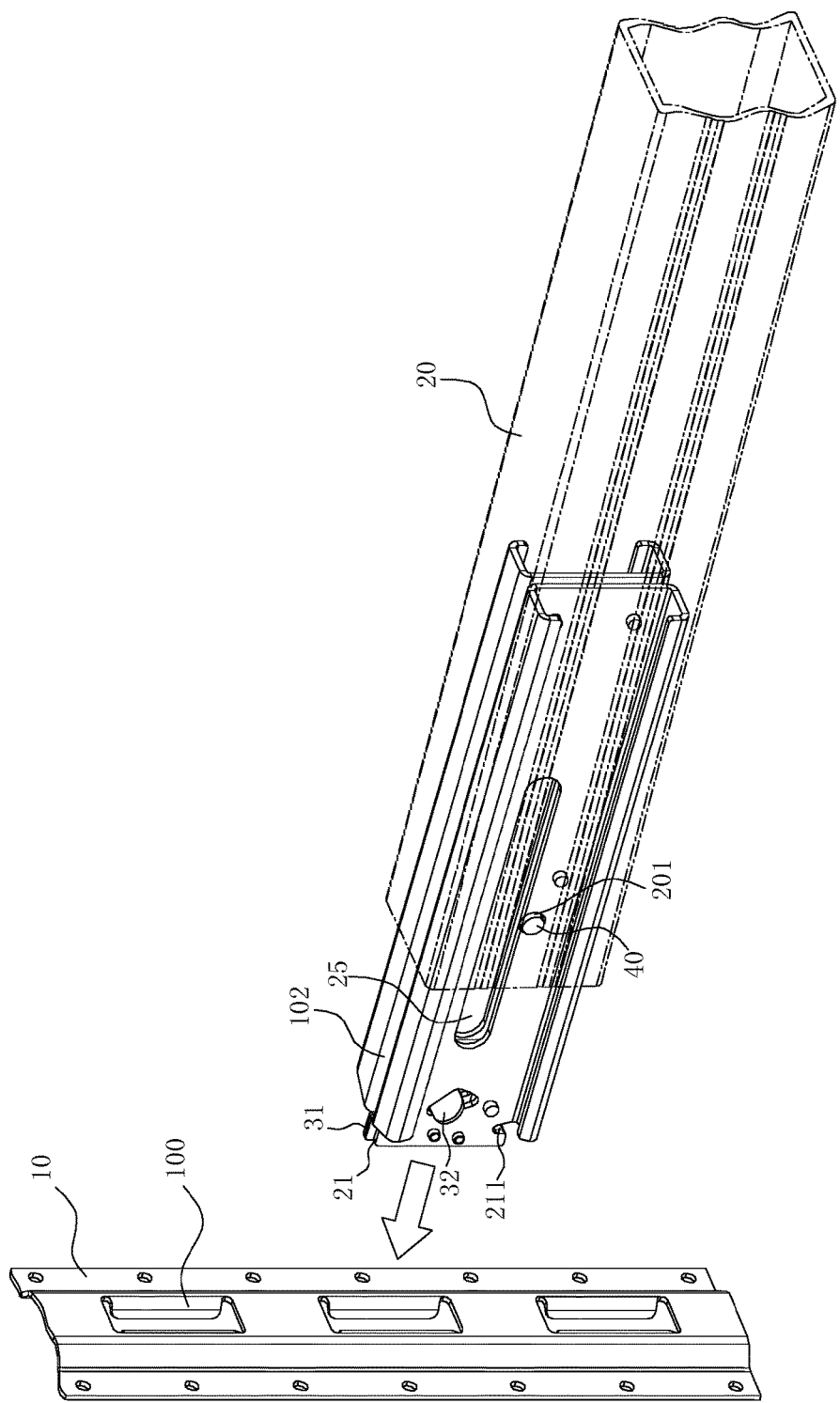
FIG. 3 is another perspective view of the fastening tip according to the embodiment of the present invention, before a fastening tip is connected to a track.

To enable a further understanding of the present invention content of the invention herein, refer to the detailed description of the invention and the accompanying drawings below:

A fastening for connecting a cargo support beam to a track in this embodiment is used for detachably mounting the cargo support beam into a container. Specifically, a track 10 arranged longitudinally is disposed on an inner wall of a container, and a plurality of positioning holes 100 arranged at intervals in a longitudinal direction are disposed on the track 10. The fastening tip of this embodiment can be detachably connected to the positioning holes 100, and a cargo support beam tube 20 can be sheathed on the periphery of the fastening tip and thus mounted within the container.

As shown in FIG. 1-FIG. 5, the fastening tip for connecting a cargo support beam to the track 10 with a plurality of positioning holes 100 in this embodiment comprises: a first side plate 1 having a body, a top edge, a bottom edge, an insertion portion 11 extending away from the top edge;

a second side plate 2, having a body, a top edge, a bottom edge, an insertion portion 12 extending away from the top edge;

a mounting clearance 102 being formed between the first side plate 1 and the second side plate 2, the mounting clearance 102 having a front side; a stopping plate 3 with a top portion, a bent middle portion and a rear portion, rotatably disposed in the front side of the mounting clearance 102;

a lining plate 4 disposed within the mounting clearance 102;

and a torsional spring 5 with two ends disposed under the stopping plate 3.

The first side plate 1 and the second side plate 2 are disposed parallel to each other and are fixedly connected via connecting rivets 50. The insertion portions 11, 21 both are inserted into the positioning holes 100 of the track 10. The lining plate 4 is fixed in the rear portion of the stopping plate 3 via a fixed pin 60. The torsional spring 5 enables the top portion 31 of the stopping plate 3 to rest against the edge of the positioning hole 100.

Specifically, in the assembled state, the front end of the lining plate 4 is aligned with the front ends of the insertion portions 11, 21 of the first side plate 1 and the second side plate 2. The first side plate 1 and the second side plate 2 respectively have a first limiting opening 111, 211 on the insertion portion 11, 21 and adjacent to the bottom edge of the first side plate 1 and the second side plate 2, which is clamped and limited by lower edges of the positioning holes 100. Correspondingly, a second limiting opening 41 aligning with the first limiting openings 111, 211 on the insertion portion 11 is formed on the lining plate 4.

In this embodiment, the stopping plate 3 is L-shaped, he bent middle portion of the stopping plate 3 is rotatably connected to at least one of the first side plate 1 and the second side plate 2 via a pin 30, and an accommodating opening 42, for receiving rotatably the rear portion of the stopping plate 3, is formed in front of the lining plate 4. The top surface of the top portion 31 of the stopping plate 3 is flat, and a declining portion 43 for allowing the upper portion of the stopping plate 3 to rotate backward is formed on the lining plate 4. The stopping plate 3 has two operating fins 32 respectively passing through the first side plate 1 and/or the second side plate 2, and the operating fins 32 are obliquely arranged at the rear of the stopping plate 3. A manipulation hole 12,22 for allowing the operating fin 32 to pass therethrough is formed on each of the first side plate 1 and the second side plate 2, and the manipulation holes 12, 22 are aligned with the accommodating opening 42. And upper edges of the accommodating opening 42 and the manipulation holes 12, 22 are configured as support plates capable of providing a support force for the operating fins 32 in rear of the stopping plate when the top of the stopping plate 3 tightly resists against the positioning holes 100. In this embodiment, the support plate is shaped as a slope 421,121,221 corresponding to the operating fin 32. The torsional spring 5 is disposed within the accommodating opening 42 and mounted within the mounting clearance 102 via a pin 70. One end of the torsional spring rests against the lower surface of the stopping plate 3, while other end of the torsional spring rests against a bottom edge of the accommodating opening 42 so as to provide an elastic force for the stopping plate 3 so that the stopping plate is always kept in an upward bounced state.

In this embodiment, the top edge and the bottom edge of the first side plate 1 extended away from the body to form a first upper support arm 13 and a first lower support arm 14; the top edge and the bottom edge of the second side plate 2 extended away from the body to form a second upper support arm 23 and a second lower support arm 24; and the top surface of the top portion 31 of the stopping plate 3 is lower than an upper surface of the first upper support arm 13 and an upper surface of the second upper support arm 23. By providing the support arms, on one hand, the operating fins 32 extending out from two sides of the first side plate 1 and the second side plate 2 can be protected, so that the operating fins 32 are prevented from damage due to the extrusion of cargos or by an external force. On the other hand, the contact area of the first side plate 1 and the second side plate 2 with the cargo support beam tube 20 is increased, so that the connection therebetween is more stable. The cargo support beam tube 20 is transversely and movably sheathed around the first side plate 1 and the second side plate 2; guide holes 15, 25, which are formed transversely, are defined on the body of the first side plate 1 and the second side plate 2; a connecting hole 201 for allowing a guide pin 40 to pass therethrough is formed on the cargo support beam tube 20.

Figure 4:
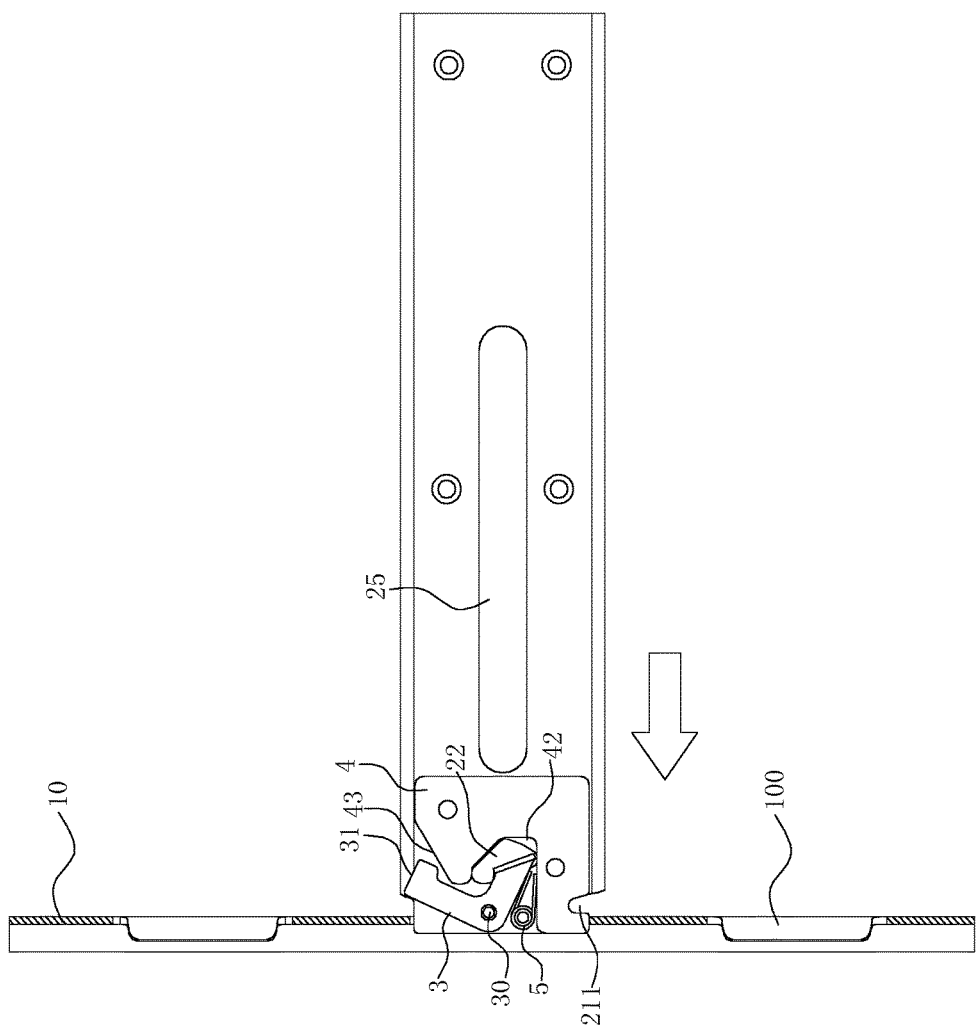
FIG. 4 is another perspective view of the fastening tip according to the embodiment of the present invention, in a state in which the fastening tip is connected to the track.
Figure 5:
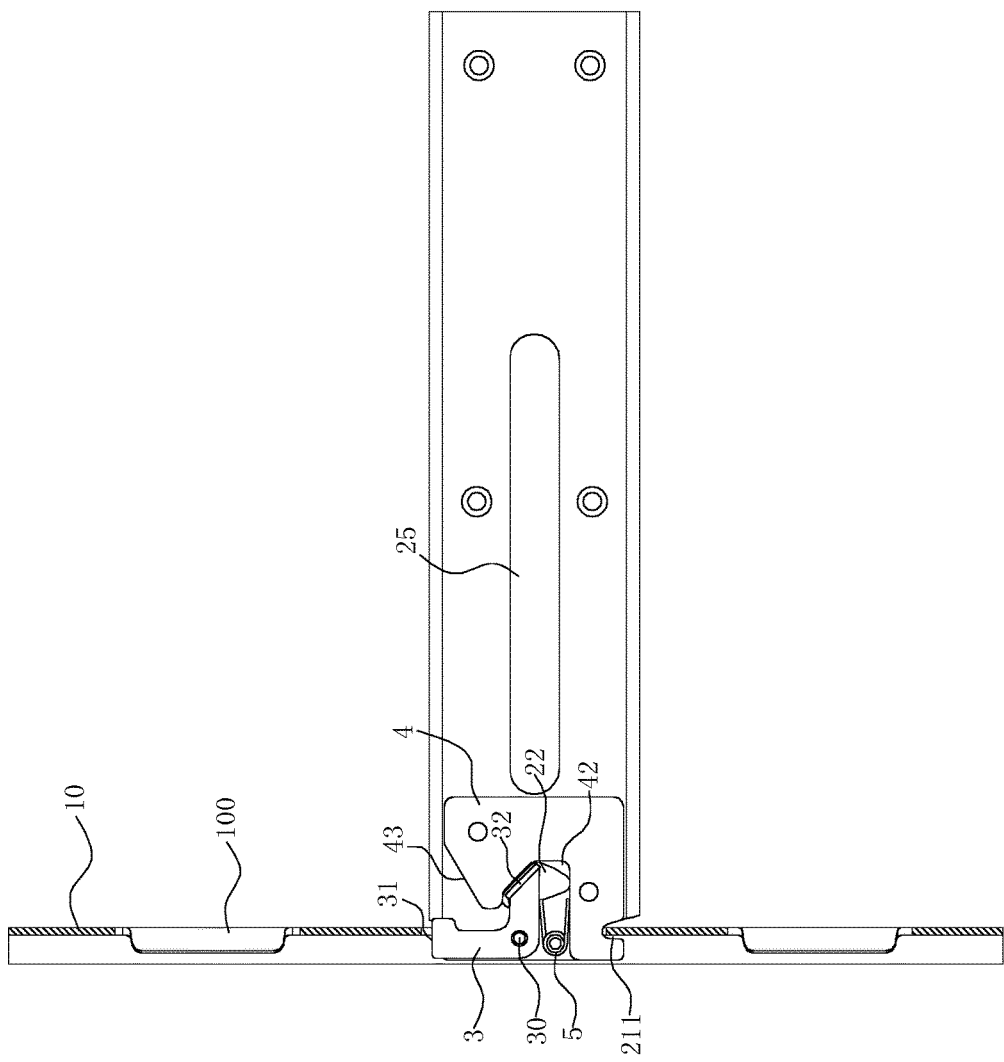
FIG. 5 is another perspective view of the fastening tip according to the embodiment of the present invention, in a state in which the fastening tip is completely connected to the track.

When in use of the fastening tip for connecting a cargo support beam to a track in this embodiment, the insertion portions 11, 21 in the front of the fastening tip are inserted into the positioning holes 100 and pushed forward. As shown in FIG. 4, at the beginning of pushing, the upper end of the stopping plate 3 is rotated backward due to the extrusion of the upper sides of the positioning holes 100. In this case, the torsional spring 5 is compressed by the bottom of the stopping plate 3. Then, the fastening tip is continuously pushed forward, so that the limiting openings 111, 211,41 on the first side plate 1, the second side plate 2 and the bottom of the lining plate 4 are clamped by the lower edges of the positioning holes 100, as shown in FIG. 5. In this case, the stopping plate 3 is restored due to the elasticity of the torsional spring 5, and the top surface of the top portion 31 is clamped into the positioning holes 100 and resists against the inner edges of the tops of the positioning holes 100, so that the fastening tip is locked on the inner wall of the container. When the fastening tip is to be detached from the inner wall of the container, the operating fins 32 are stirred to one side, so that the bottom of the stopping plate 3 compresses down the torsional spring 5. Meanwhile, the upper portion of the stopping plate 3 is rotated backward to separate from the positioning holes 100. In this case, the fastening tip may be detached from the inner wall of the container by lifting the fastening tip upward and then pulling backward. The operation is very convenient.

The invention claimed is:

1. A fastening tip for connecting a cargo support beam to a track with a plurality of positioning holes, comprising:
   a first side plate having a body, a top edge, a bottom edge, an insertion portion extending away from the top edge, a first limiting opening defined on the body and adjacent to the bottom edge;
   a second side plate having a body, a top edge, a bottom edge, an insertion portion extending away from the top edge, a first limiting opening defined on the body and adjacent to the bottom edge;
   the first side plate and the second side plate being disposed parallel to each other;
   a mounting clearance being formed between the first side plate and the second side plate, the mounting clearance having a front side;
   a stopping plate with a top portion, a bent middle portion and a rear portion, rotatably disposed in the front side of the mounting clearance;
   an operating fin connected to the stopping plate, the operating fin having a transversal flat surface extending away from the stopping plate;
   a lining plate disposed within the mounting clearance; and
   a torsional spring with two ends disposed under the stopping plate;
   wherein
   the torsional spring enables the top portion of the stopping plate to rest against the edge of the positioning hole;
   the top surface of the top portion of the stopping plate is flat, and the stopping plate has the operating fin exposed outside;
   the lining plate engages the stopping plate when the top portion of the stopping plate tightly resists against the edge of the positioning hole.

2. The fastening tip of claim 1, wherein
   the stopping plate is L-shaped;
   the bent middle portion of the stopping plate is rotatably connected to at least one of the first side plate and the second side plate;
   an accommodating opening, for receiving rotatably the rear portion of the stopping plate, is formed in front of the lining plate;
   the torsional spring is disposed within the accommodating opening; and
   one end of the torsional spring rests against the lower surface of the stopping plate, while other end of the torsional spring rests against a bottom edge of the accommodating opening.

3. The fastening tip of claim 2, wherein the operating fin is obliquely arranged at the rear end of the stopping plate, and the support plate is shaped as a slope corresponding to the operating fin;
   a manipulation hole for allowing the operating fin to pass therethrough is formed on each of the first side plate and the second side plate, and the manipulation holes are aligned with the accommodating opening.

4. The fastening tip of claim 2, wherein a declining portion for allowing the upper portion of the stopping plate to rotate backward is formed on the lining plate.

5. The fastening tip of claim 1, wherein a second limiting opening aligning with the first limiting openings on the insertion portion is formed on the lining plate.

6. The fastening tip of claim 1, wherein
   the top edge and the bottom edge of the first side plate extended away from the body to form a first upper support arm and a first lower support arm;
   the top edge and the bottom edge of the second side plate extended away from the body to form a second upper support arm and a second lower support arm; and
   the top surface of the top portion of the stopping plate is lower than an upper surface of the first upper support arm and an upper surface of the second upper support arm, or aligned with the upper surface of the first upper support arm and the upper surface of the second upper support arm.

7. The fastening tip of claim 1, wherein a cargo support beam tube is transversely and movably sheathed around the first side plate and the second side plate;
   guide holes, which are formed transversely, are defined on the body of the first side plate and the second side plate;

a connecting hole for allowing a guide pin to pass therethrough is formed on the cargo support beam tube.

* * * * *